United States Patent [19]

Goela et al.

[11] Patent Number: 5,683,028
[45] Date of Patent: Nov. 4, 1997

[54] BONDING OF SILICON CARBIDE COMPONENTS

[75] Inventors: Jitendra S. Goela, Andover; Lee E. Burns, Reading, both of Mass.

[73] Assignee: CVD, Incorporated, Woburn, Mass.

[21] Appl. No.: 646,737

[22] Filed: May 3, 1996

[51] Int. Cl.$^6$ .................. B23K 103/16; B23K 31/00
[52] U.S. Cl. ................................. 228/121; 228/132
[58] Field of Search ................................. 228/121, 131, 228/132, 134, 262.2; 264/60; 427/249, 255, 419.7; 437/228

[56] References Cited

U.S. PATENT DOCUMENTS

| | | | |
|---|---|---|---|
| 3,813,759 | 6/1974 | Heap et al. | 228/121 |
| 4,499,360 | 2/1985 | Rottenbacher | 228/121 |
| 4,762,269 | 8/1988 | Gyarmati et al. | 228/194 |
| 5,071,596 | 12/1991 | Goela et al. | |
| 5,374,412 | 12/1994 | Pickering et al. | |
| 5,465,184 | 11/1995 | Pickering et al. | |
| 5,604,151 | 2/1997 | Goela et al. | 437/100 |

*Primary Examiner*—Samuel M. Heinrich
*Attorney, Agent, or Firm*—Wayne E. Nacker; Gerald K. White

[57] ABSTRACT

A method of bonding a first silicon carbide part to a second silicon carbide part is provided. The first silicon carbide part provides a receiving female joint member and the second silicon carbide part provides an insertion male joint member. The male and female members each have facing sidewalls substantially parallel to a direction in which the male member is inserted into the female member. The male and female joint members are configured to provide an average gap(s) between the facing sidewalls of the joint members which is up to about 0.003 inch (0.76 mm). The female joint member further has reservoir means for containing silicon when the male joint member is fully inserted into the female joint member, the reservoir means being in fluid communication with the gap(s). The reservoir means is filled with solid-state silicon, e.g., in powder form. The male joint member is inserted into the female joint member, and the first and second silicon carbide parts are heated to above the melting point of silicon for a time sufficient for the silicon to melt, whereupon molten silicon is drawn into the gap(s) between the facing sidewalls of the male and female joint members by capillary action. Subsequent cooling of the assembled parts solidifies the silicon, thereby securing the joint between the male and female members with solidified silicon forming a bond between the facing sidewalls of the male and female joint members.

4 Claims, 3 Drawing Sheets

FIG. 1
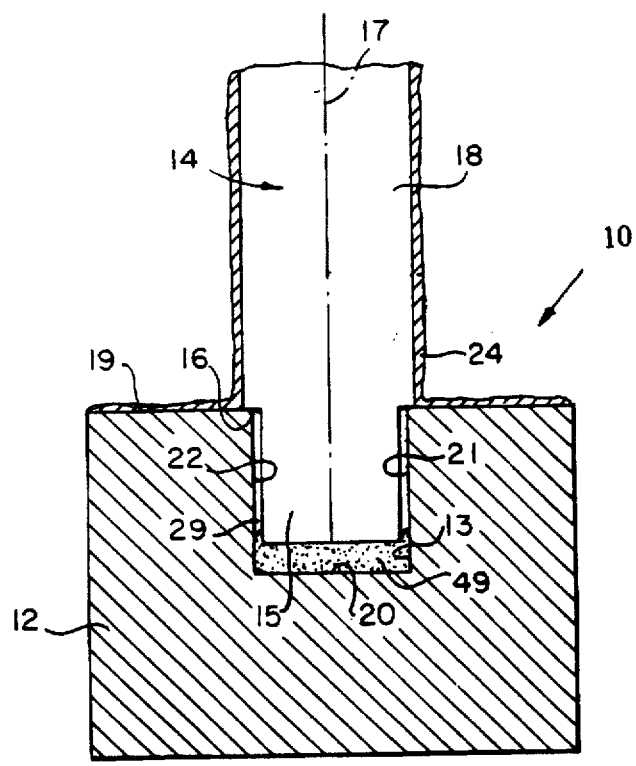
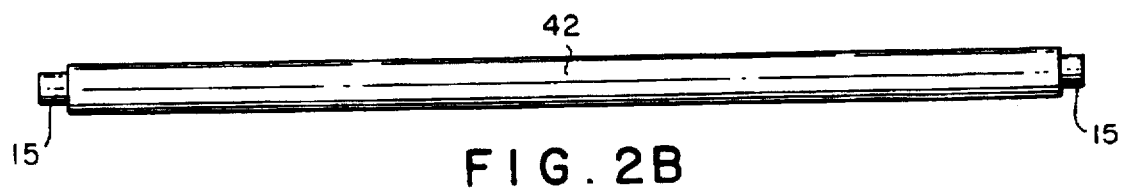
FIG. 2B
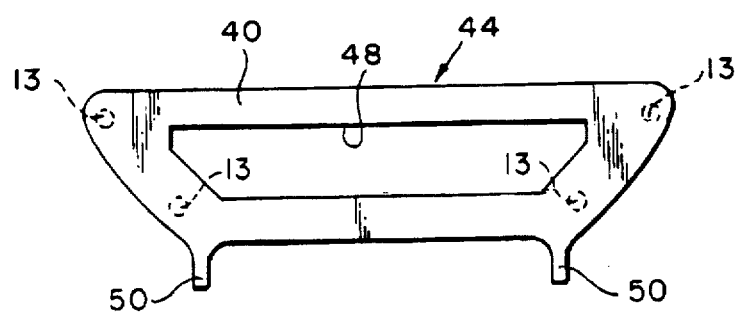
FIG. 2C

FIG. 3A
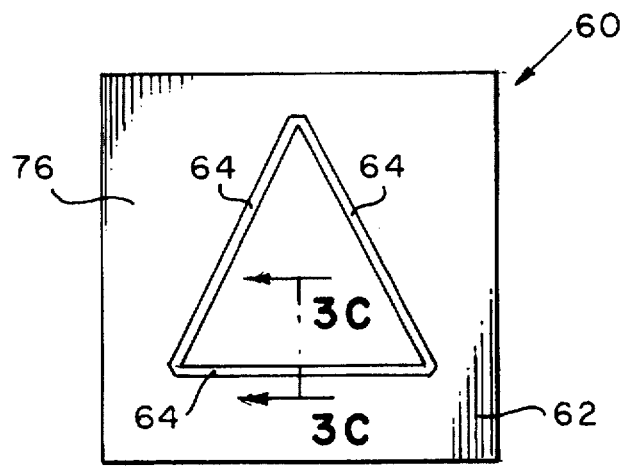
FIG. 3B
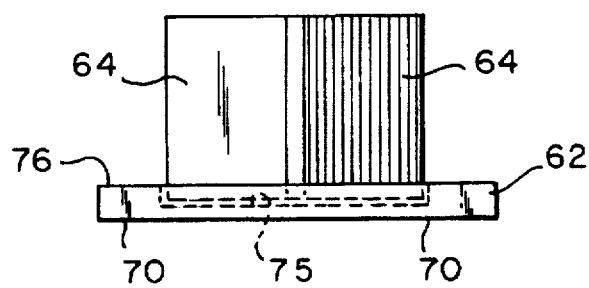
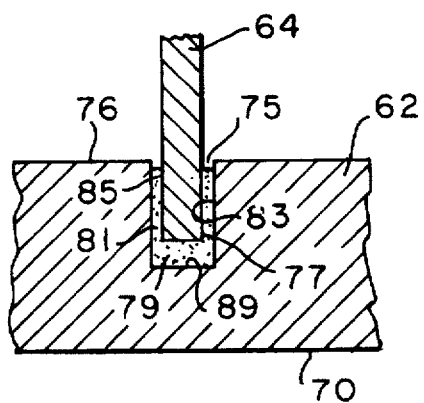
FIG. 3C

BONDING OF SILICON CARBIDE COMPONENTS

The present invention is directed to bonding silicon carbide components or parts, particularly silicon carbide components produced from chemical vapor deposited silicon carbide (CVD-SiC).

BACKGROUND OF THE INVENTION

Silicon carbide (SiC), particularly CVD-SiC, has unique combinations of properties making it particularly suitable for specialized materials applications. An example of CVD-SiC which is highly thermally conductive, chemically and oxidatively stable, heat stable, hard, scratch-resistant, electrically resistive, and theoretically dense is described in U.S. Pat. No. 5,374,412 to Pickering et al., the teachings of which are incorporated herein by reference. Applications of CVD-SiC include fabrication of lightweight ceramic mirrors, e.g., U.S. Pat. No. 5,071,596 to Goela et al., the teachings of which are incorporated herein by reference; hard drive discs, U.S. Pat. No. 5,465,184, the teachings of which are incorporated herein by reference; and semiconductor furniture, e.g., where silicon wafers are handled and processed in high-temperature environments.

While SiC, particularly CVD-SiC, has many properties highly desirable in specialized applications, some of these same properties render it a difficult material from which to fabricate articles. For example, its hardness renders SiC difficult to machine. SiC's high density, particularly CVD-SiC which is theoretically dense, provides little to absolutely no porosity which might facilitate bonding of SiC components using an adhesive.

CVD-SiC is typically deposited on a mandrel, e.g., a graphite mandrel, as a monolithic structure. To some extent, the shape of the mandrel may be used to define the shape of the manufactured object. For example, a concave mirror blank may be deposited on an appropriately shaped convex graphite mandrel. Likewise, post-deposition machining of a monolithic CVD-SiC sheet or block may be used to form the desired object, such as hard disc drives or read/write heads as described in above-referenced U.S. Pat. No. 5,465,184. Nevertheless, the difficulty of machining and bonding SiC, particularly theoretically dense (entirely non-porous) CVD-SiC, presents substantial difficulties in fabricating articles too complex or too bulky to be practically fabricated from a single, monolithic, deposited sheet or block. Furthermore, it is to be appreciated that the specialized applications, to which CVD-SiC articles are often put, require that any bonds withstand extremes, such as temperature extremes. Thus, in fabricating semiconductor furniture from a plurality of CVD-SiC parts, substantially all organic-based adhesives are entirely unsuitable because they would decompose far below the semiconductor processing temperatures.

Several techniques have been proposed to bond SiC parts or components. These include direct bonding (reference 1 and 2 below), codensification of interlayers and green bodies (reference 3), hot pressing of suitable SiC powders (reference 4), bonding with polymeric precursors (reference 5), brazing (references 1, and 6–9), reactive metal bonding (reference 10), "pressurized combustion reaction", reaction with and without the use of tape (references 12–14), and microwave joining (references 15 and 16). These techniques have limited utility for semiconductor applications due to one or more drawbacks, such as use of filler material which can contaminate the furnace environment, inability of joints to withstand high service temperatures, and the need for very high temperatures or pressures during joining processing. Furthermore, most of these references do not concentrate on male/female joints, where, for example, a rod is inserted into a hole and then bonding is performed. Such male/female joints are particularly desirable for fabricating wafer carriers and other furnace support components for the semiconductor industry.

1. T. J. Moore, "Feasibility Study of the Welding of SiC," *J. Amer. Ceram. Soc.*, 68, C151–153 (1985).
2. D. Deleeuw, "Effects of Pressure and Deformation on the Strength and Microstructure of Diffusion-Bonded Silicon Carbide," *J. Amer. Ceram. Soc.*, 75, 725–727 (1992).
3. C. H. Bates, et al., "Joining of Non-Oxide Ceramics for High-Temperature Applications," *Amer. Ceram. Soc. Bull.*, 69, 350–356 (1990).
4. T. Iseki, K. Arakawa and H. Suzuki, "Joining of Dense Silicon Carbide by Hot Pressing," *J. Mater. Sci. Letters*, 15, 1049–1050 (1980)
5. S. Yajima, et al., "Joining of SiC to SiC Using Polyborosiloxane," *Amer. Ceram. Soci. Bull.*, 60, 253 (1981).
6. J. A. P. Gehris, "High Temperature Bonding of Silicon Carbide," M.S. Thesis, New Mexico Institute of Mining and Technology, Socorro, N. Mex. (1989).
7. N. Tamari, et al., "Joining of Silicon Carbide Ceramics with $Si_3N_4$-$Y_2O_3$-$La_2O_3$-MgO Mixture," *Yogyo-kyokai-Shi*, 94, 1087–1091 (1986).
8. J. K. Boadi, T. Yano and T. Iseki, "Brazing of Pressureless-Sintered SiC Using Ag-Cu-Ti Alloy," *J. Mater. Sci.*, 22 2431–2434 (1987)
9. J. R. McDermid and R. A. L. Drew, "Thermodynamic Brazing Alloy Design for Joining Silicon Carbide," *J. Amer. Ceram. Soc.*, 74, 1855–1860 (1991)
10. S. Morozumi, et al., "Bonding Mechanism Between Silicon Carbide and Thin Foils of Reactive Metals," *J. Mater. Sci.* 20, 2976–3982 (1985)
11. B. H. Rabin, "Joining of Fiber-Reinforced SiC Composites by In Situ Reaction Methods," *Mater. Sci. Eng.* A130, L1–L5 (1990)
12. B. H. Rabin, "Joining of SiC/SiC Composites and Dense SiC Using Combustion Reactions in the Ti-C-Ni System," *J. Amer. Ceram. Soc.*, 75, 131–135 (1992)
13. B. H. Rabin, G. A. Moore, "Joining of SiC-Based Ceramics by Reaction Bending Methods," *J. Mat. Synth. & Proc.*, 1, 195–201 (1993)
14. B. H. Rabin, "Modified Tape Casting Method for Ceramic Joining: Application to Joining of Silicon Carbide," *J Amer. Ceram. Soc.*, 73, 2757–2759 (1990)
15. I. Ahmed and R. Silberglitt, "Joining Ceramics Using Microwave Energy," *Mat. Res. Soc. Symp. Proc.*, 314, 119–130 (1993)
16. R. Silberglitt, I. Ahmad, W. Murray Black and J. D. Katz, "Recent Developments in Microwave Joining," *MRS Bulletin*, 47–50 (November 1993)

At the present time there is no suitable way to adhere male/female joints, particularly where very close dimensional tolerances are required. Herein, a male/female joint is broadly defined as a joint in which an inserted (male) member is received within and bonded to a receiving (female) member, and in which sidewalls of the male and female members are substantially parallel to the insertion direction, i.e., within 10° of parallel, most commonly fully parallel. Such a male/female joint may be a rod inserted, for example, in a receiving closed-end bore or a sheet having parallel sides inserted in a receiving slot or grove. In bonding such a joint, it is desirable that bonding be effected between the sidewalls to provide good stability to the manufactured article. Unlike in a butt joint, it is not possible to provide pressure along the sidewalls between a male and female member. Accordingly, it is a general object to provide a method of bonding SiC parts together using male/female joints so that bonding is achieved along the facing sidewalls of the male and female joint members.

BRIEF DESCRIPTION OF THE DRAWINGS

FIG. 1 is a cross-sectional view of a male/female joint formed between a (male) cylindrical rod and a (female) closed-end bore.

FIG. 2B is an elevation view of one of the four rods used to form the rails of the wafer holder of FIG. 2A.

FIG. 2C is an elevation view of one of the two end plates used to form the wafer holder of FIG. 2A.

FIG. 3A is a rear elevation view of a lightweight mirror substrate using CVD-SiC components bonded in accordance with the method of the present invention.

FIG. 3B is a side elevation view of the lightweight mirror substrate of FIG 3A.

FIG. 3C is a cross-sectional view taken along line 3C—3C of FIG. 3A.

SUMMARY OF THE INVENTION

Figure 2A:
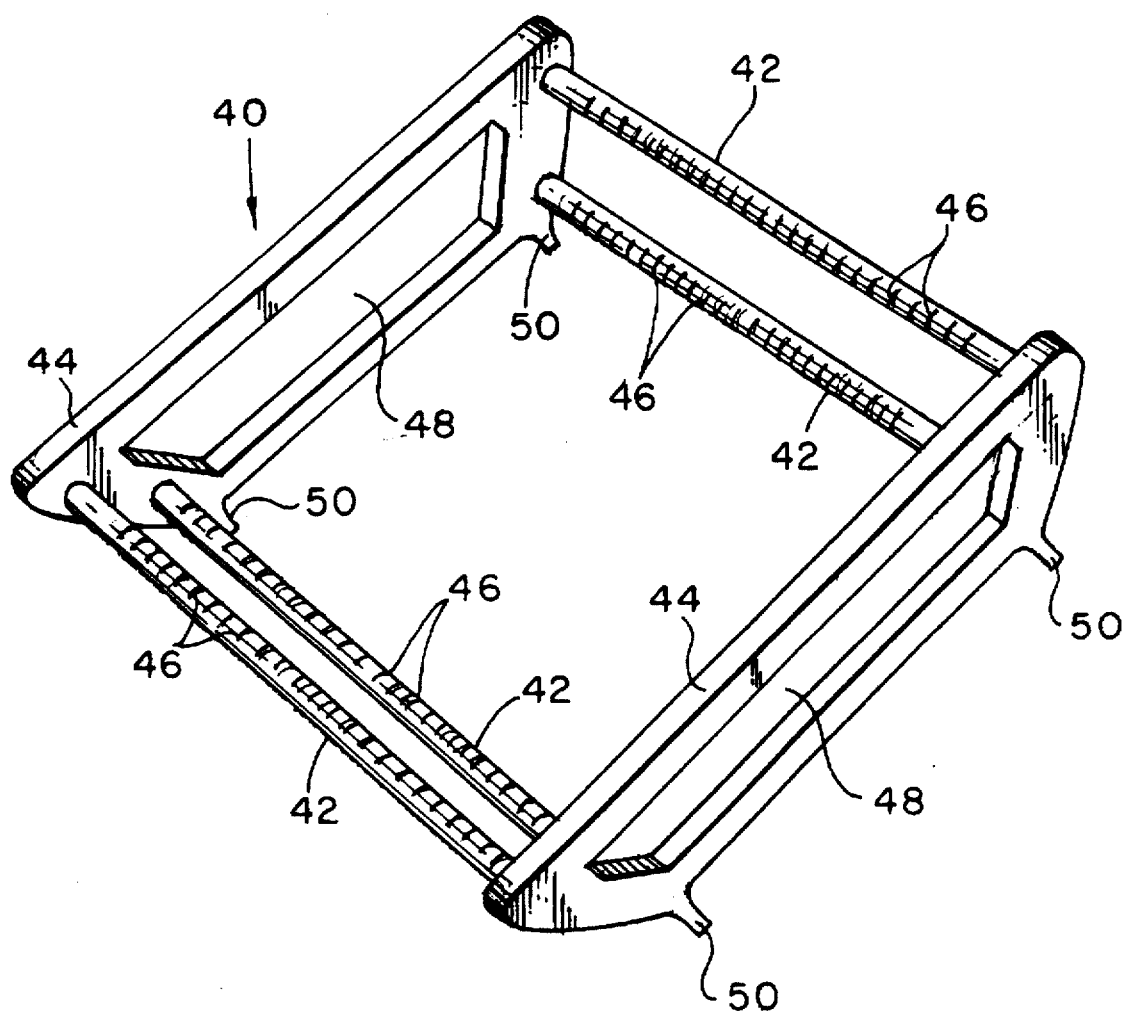
FIG. 2A is a perspective view of a CVD-SiC wafer holder formed of component parts adhered with joints as illustrated with respect to FIG. 1.

The invention provides a method of bonding a first silicon carbide part to a second silicon carbide part, the first silicon carbide part providing a receiving female joint member and the second silicon carbide part providing an insertion male joint member. The male and female joint members each have facing sidewalls substantially parallel to a direction in which the male member is inserted into the female member, the male and female joint members being proportioned to provide an average gap(s) between the facing sidewalls of up to about 0.003 inch (0.76 mm). The female joint member further provides reservoir means for receiving solid-state silicon while still permitting the male joint member to be fully inserted into the female member, the reservoir means being in fluid communication with the gap(s). The reservoir means is filled with solid silicon, e.g., in powder form; the male joint member is inserted into the female joint member; and the first and second parts are heated to above the melting point of silicon for a time sufficient for the silicon to melt; whereupon molten silicon is drawn into the gap(s) between the facing sidewalls of the male and female joint members by capillary action. Subsequent cooling of the assembled parts solidifies the silicon, thereby securing the joint between the male and female joint members with solidified silicon forming a bond between the facing sidewalls of the male and female joint members.

In applications where exposed silicon is deemed undesirable, the gap(s) between the male and female joint members are sealed by depositing by chemical vapor deposition (CVD) a layer of silicon carbide on the joined parts. In a method preferred for certain applications, i.e., where it might be considered undesirable for any silicon to be on the SiC surfaces, the silicon carbide is deposited at a temperature sufficiently elevated for CVD deposition but below the melting point of silicon. In this method, after sealing the gap(s), the temperature is raised to above the melting temperature of silicon and so maintained for a time sufficient to melt the silicon and ensure capillary transfer of molten silicon to within the gap(s) to between the facing sidewalls.

However, it is also within the scope of the invention to form the bond by melting the silicon to form a (molton silicon) joint and subsequently sealing the joint with silicon carbide; alternatively, the deposition of silicon carbide seal and the melting of the silicon to form the joint may be simultaneous.

DETAILED DESCRIPTION OF CERTAIN PREFERRED EMBODIMENTS

Illustrated in FIG. 1 is a male/female joint 10 formed in accordance with the method of the present invention. The joint 10 is formed between a first CVD-SiC part 12, illustrated as a block, having a female joint member 13 which is a cylindrical, closed-end bore in the block, and a second CVD-SiC part 14 which is a cylindrical rod, the rod having a male joint member 15 which is a narrowed-down cylindrical insertion end portion of the cylindrical rod. In the particular joint 10 illustrated, the narrowed down end portion which provides the male joint member 15, also is machined to provide an annular shoulder 16, transverse to the cylindrical axis 17. The diameter of the main portion 18 of the rod 14 is proportioned relative to the male joint member 15 so that the shoulder 16 seats on an outer face 19 of the first joint part 12 when the male joint member 15 is inserted into the female joint member 13. The length (in the axial direction) of the male joint member 15 is less than the depth of the female joint member 13, thereby providing a space or reservoir 20 between the inner ends of the male and female joint members. The diameter of the female member 13 is proportioned relative to the outside diameter of the male member 15 so that there is a gap 29 of up to about 0.003 inch (typically 0.001 to 0.003 inches) between the sidewall 21 of the female member and the sidewall 22 of the male member, the sidewalls 21, 22 being parallel to the cylindrical axis 17 which defines the insertion direction. (Thus, the diameter of the female member 13 is up to about 0.006 inch (0.152 mm) greater than the diameter of the male member 15. The gap 29 spacing of up to 0.003 inch is average spacing, as the two parts 12, 14 may not necessarily seat perfectly centered along the cylindrical axis 17.) In forming a joint 10 as shown in FIG. 1, a reservoir 20 between about 1 and about 3 mm in depth is typical, but this may vary widely, according to amount of silicon needed to bond a particular joint.

While some gap is required between the facing sidewalls so that silicon might enter the gap, there is no theoretical limit to the thinness of the gap. It is believed if the gap is extremely narrow, transfer of silicon to between the gap may be more by silicon vapor entering the gap than by capillary action, but such transfer is considered within the scope of the invention. It is generally difficult to machine SiC parts to provide gaps less than about 0.0005 inch and the gap is typically 0.001 inch up to 0.003 inch.

To adhere the two parts 12 and 14 together, solid-state (particularly powdered) silicon is added to the reservoir 20 (herein the bottom or inner end of the female joint member 13). The joint 10 illustrated in FIG. 1 is intended for a device used in semiconductor handling. While silicon is not considered a contaminant to the furnace environment when silicon wafers are being handled, impurities, such as gases absorbed or adsorbed by the bonding silicon, may be considered to be contaminants. Furthermore, it is desirable to protect the bonding silicon from out-gassing during subsequent high-temperature use and to prevent the bonding silicon from being etched by acids or bases during cleaning of the article of which the joint 10 forms a part. Accordingly, the joint 10 is sealed by deposition of a CVD-SiC layer or cladding 24 on the article. Deposition of the CVD-SiC layer 24 is at a sufficiently elevated temperature, e.g., 1350° C., to deposit the layer or cladding 24, but which is below the melting point (1420° C.) of silicon. After the CVD-SiC cladding 24 is deposited, preferably without removing the article from the furnace, the temperature is increased to above the melting temperature of silicone, e.g., to between about 1450° C. and about 1500° C. so as to melt the silicon contained within the reservoir 20 of the joint 10. The molten silicon is drawn by capillary action to the gap 29 between the sidewalls 21, 22 of the male 15 and female 13 joint members. Upon cooling, the silicon solidifies, thereby bonding the joint members 13, 15.

This techniques has several attractive features.
1. Male/female joint members are bonded together.
2. The technique can be used to fabricate SiC articles, particularly CVD-SiC articles, of complex shape for use in the semiconductor industry because the bonding agent, silicon, is not considered a contaminant in silicon device processing.
3. The resulting joints have mechanical strength that is comparable to the parent material (SiC).
4. The articles may be heated to high temperatures, e.g., 1200°–1400° C. without significantly weakening the joints. Because the CVD-SiC cladding seals the bonding silicon within the joints, it is possible in some cases to use the bonded articles at even higher temperatures.
5. The CVD-SiC cladding fills and heals any fabrication flaws in the parts and thus enhances mechanical strength of the parts.
6. Both the step of CVD-SiC cladding and subsequent silicon melting can (and preferably are) performed sequentially during the same furnace loading.
7. Silicon and Silicon Carbide have similar coefficients of thermal expension; thus, the bonds remain intact during repeated heating and cooling cycles.
8. Silicon-rich silicon carbide is known, and it is believed that in forming the bond, silicon may migrate into the silicon carbide forming silicon-rich silicon carbide at the interface, thereby forming a region of a continuum between silicon and silicon carbide.
9. If the SiC is deposited at low pressures, and SiC deposition is often done at 200 torr or below, the SiC deposition seals a vacuum in any space not occupied by silicon, which vacuum enhances the strength of any joint.

Illustrated in FIG. 2A is a wafer carrier 40 fabricated using joints as are described above in respect to FIG. 1. The wafer carrier 40 is fabricated with eight joints 10 by which four rods or rails 42 (FIG. 2B), each providing a pair of terminal male joint members 15 (as per FIG. 1), with two end plates 44 (FIG. 2C), each providing four female joint members 13 (as per FIG. 1). Each rail 42 is fabricated from a monolithic piece of CVD-SiC, as is each end plate 44. In FIG. 2A, the rails are shown with grooves or slots 46 proportioned to hold silicon wafers; these grooves 46 are preferably cut subsequent to assembling the wafer carrier 40.

The rails 42 are each cylindrical and have machined at each end a male joint member 15. The end plates 44 are each generally trapezoidal in shape having female joint members 13 bored at each of the corners. The illustrated end plates 44 are provided with trapezoidal openings 48 for weight reduction, but these are not an absolute necessity. Each of the end plates 44 also is fashioned with a pair of legs 50 at the narrower end of the trapezoid to ensure that wafers held by the carrier 40 are spaced above a furnace floor. To fabricate the carrier, silicon powder 49 is added to each of the female joint members 13 of the end plates 44, the bottom of the female joint member 13 serving as a reservoir; the male joint members 15 at the ends of the rails 42 are inserted; the assembly is place in a furnace where first CVD-SiC cladding is deposited and then the wafer carrier 40 is heated sufficiently to melt the solid silicon powder 49. Subsequently, the wafer carrier 40 is cooled, to solidify the silicon.

Illustrated in FIGS. 3A, 3B, and 3C is a lightweight mirror substrate 60 in which a CVD-SiC faceplate 62 is reinforced with three CVD-SiC ribs 64 bonded thereto in accordance with the method of the present invention. As noted in above-referenced U.S. Pat. No. 5,374,412 to Pickering et al., CVD-SiC is theoretically dense and is very highly polishable. Accordingly, CVD-SiC is an excellent substrate for mirrors, such as might be used in spacecraft. In the illustrated mirror substrate 60, the front face 70 of the faceplate 62 provides the surface on which the mirror is formed. In this case, the mirror-forming surface 70 is flat, although it could be concave, convex, etc.

In spacecraft, weight is a premium, and it is desirable to fabricate any part, such as a mirror, to be as light as possible. Accordingly, the faceplate 62 may be fabricated from a thin piece of CVD-SiC, e.g., 0.2" (5 mm) thick. While CVD-SiC is a very hard material, in such thin layers, it is nevertheless somewhat flexible. Accordingly, very thin CVD-SiC ribs 64, e.g., about 0.040" (1 mm) thick, are joined to the rear face of the faceplate 62 to reenforce the dimensional stability of the faceplate. In the illustrated mirror substrate 60, three slots 75 of rectangular cross-section having vertical sidewalls 85 are machined into the rear face 76 of the faceplate 62. The slots 75, which function as the female joint members, are arranged in a triangular array in the illustrated mirror substrate assembly 60; however, other rib arrangements can be easily envisioned. In this case, as best seen in FIG. 3C, an edge 77 of the each of the ribs 64 is received into each slot 75 and functions as the male joint member. Before inserting each rib 64, each slot is filled with a controlled amount of silicon powder 79, the bottom of each slot 75 serving as the reservoir 89. After the ribs 64 are inserted, the mirror substrate assembly 60 is placed in a furnace and heated to a temperature above the melting point of silicon and held at such temperature until the silicon melts and transfers by capillary action to gaps 81 between the sidewalls 83 of the slots 75 and the sidewalls 85 of the inserted edges of the ribs 64. When the assembly 60 is allowed to cool, an excellent bond is formed between the ribs 64 and the faceplate 62.

The mirror substrate 60 is not used for semiconducting apparatus, it will not again be subjected to highly elevated temperatures, and it will not be repeatedly cleaned with caustic chemicals. Accordingly, in this case, there is no need to provide a CVD-SiC coating prior to melting the silicon.

Advantage of using this joining technique of the invention to fabricate lightweight mirror substrates are as follows:
1. Mirror substrates with closed backs can be fabricated.
2. SiC backstructure of uniform ribs can be fabricated. This can provide high stiffness with low mirror weight.
3. Lightweight mirrors with high aspect ratio (ratio of backstructure cell depth to inscribed circle diameter) can be fabricated. Aspect ratio is defined as the ratio of the backstructure depth to the diameter of the inscribed circle. This feature permits obtaining structures with high stiffness to weight ratio.

The invention will now be described in greater detail by way of specific examples.

Example 1

Seven CVD—SiC samples were fabricated to demonstrate the SiC—SiC bonding by the method of the invention as described in respect to a bond such as shown in FIG. 1. The tolerances were chosen such that the side gap between the rod and the hole fell in the range of 0.001–0.003-inch. This gap is appropriate for the capillary action to push molten Si into the side gap.

Silicon powder was used to bond the samples. This powder was purchased from Johnson Matthey (Aesar) and had a purity of 99.999%. A small amount of Si powder was placed at the bottom of the plate in the hole and the rod was inserted into the hole until it was stopped at the shoulder. This assembly was placed in one deposition box of a four-box production run. The samples were heated to a temperature of 1350° C. in an argon atmosphere. Then SiC was deposited for 3 hours by passing a mixture of MTS, $H_2$ and Ar through the deposition area. The flow rates of MTS, $H_2$ and Ar used were 6.6 slpm, 41 slpm and 33 slpm respectively. The samples were placed such that the reagent flow was impinging on them. No fixture was used to hold the male and female parts of the samples together.

After the deposition of SiC was complete, the samples remained in the deposition chamber at a temperature of 1350° C. for an additional 251.5 hours because this bonding experiment was performed together with a regular CVD-SiC production run. Next, the furnace temperature was increased to 1485° C. to melt the Si and bond the SiC samples together. The samples were maintained at 1485° C. for 0.5 hour and then the furnace cool down was initiated.

The seven SiC-bonded samples were visually inspected. The SiC coating and bonded joints appeared excellent. The male and female parts did not get separated when the bonded samples were pulled apart by hand. The thickness of the SiC coating was about 0.022 inch.

The seven SiC samples were tested in tension in an Instron® machine. Table I below lists the results of the tensile strength testing. The average tensile strength was measured to be 1536 psi. In all cases, the tensile failure was in the material and the bond remained intact. This shows that the bond strength is larger than 1536 psi.

While testing bonded samples in a tensile mode, it is difficult to ensure uniaxial tensile loading. Consequently, in order to determine the bond strength, three bonded samples were tested in a compression mode. Sample #s 5, 6 and 7 were selected for compression testing because during tensile testing, their stem broke, but the bonded joints were intact. These samples were machined to expose the male insert on both sides. Then, a stainless steel dowel was used to force the male insert out of the female part.

Table II below shows the results of compression testing. In all cases, material fractured, but the male inserts were still intact inside the female parts. The average fracture strength was measured to be 6234 psi. This shows that the bond strength is larger than 6234 psi.

TABLE I

TENSILE TEST RESULTS OF SEVEN SIC BONDED SAMPLES

| SAMPLE (NO.) | LOAD USED (lb) | DIAMETER AT FRACTURE POINT (INCH) | TENSILE STRENGTH (PSI) | REMARKS |
|---|---|---|---|---|
| 1 | 49.6 | 0.195 | 1660 | Material fractured, bond remained intact. |
| 2 | 33 | 0.195 | 1104 | Material fractured, bond remained intact. |
| 3 | 73 | 0.195 | 2444 | Material fractured, bond remained intact. |
| 4 | 48.3 | 0.197 | 1620 | Material fractured, bond remained intact. |
| 5 | 42.1 | 0.194 | 1427 | Material fractured, bond remained intact. |
| 6 | 33.6 | 0.195 | 1124 | Material fractured, bond remained intact. |
| 7 | 41 | 0.195 | 1372 | Material fracture, bond remained intact. |

Average Tensile Strength: 1536 psi

TABLE II

COMPRESSION TESTING OF SIC BONDED SAMPLES

| SAMPLE NO. | LOAD USED (LB) | DIAMETER OF MALE INSERT (INCH) | LENGTH OF MALE INSERT (INCH) | FRACTURE STRENGTH (PSI) | REMARKS |
|---|---|---|---|---|---|
| 5 | 795 | 0.150 | 0.218 | 7738 | Material fractured. Part of joint sill intact. |
| 6 | 685 | 0.150 | 0.208 | 5191 | Material fractured. Part of joint sill intact. |
| 7 | 762 | 0.150 | 0.208 | 5774 | Material fractured. Part of joint sill intact. |

Average Fracture Strength: 6234 psi

Example 2

A SiC wafer carrier, as described above with respect to FIGS. 2A–2C, was successfully fabricated by using the bonding technique of the present invention. Four rails and two plates were fabricated from CVD-SiC bulk material and were joined together using the joining technique of the invention. Silicon powder was used as the joining agent and the wafer carrier was assembled by inserting the rails into the holes in the two end plates. Then the wafer carrier was placed in the furnace in the horizontal position and SiC was deposited for three hours at a furnace temperature of 1350° C. After the deposition was completed, the furnace temperature was raised to 1500° C., maintained there for 0.5 hour, and then the furnace temperature was brought to room temperature.

The wafer carrier was examined visually. All the joints appeared strong. These was no evidence of SiC coating peeling off. The dimensions of the wafer carrier were measured to see if the structure showed any sign of distortion or warpage. No significant warpage in the structure was observed. Subsequently, twenty-five wafer slots were successfully fabricated in the wafer carrier. The SiC joints survived all the stresses associated with machining of the wafer slots.

Example 3

A lightweight SiC mirror substrate, as described above with reference to FIGS. 3A–3C, was successfully fabricated using the bonding technique of the invention. A SiC faceplate of dimension 2.25"×2.25"×0.2" was taken and slots of 1-mm wide and 1-mm deep were fabricated on one face. These slots were fabricated in a triangular shape pattern. In these slots, SiC powder was placed and three SiC ribs, each 1" wide×1.5" long×1-mm thick were placed and joined to the SiC faceplate by heating the structure to 1500° C. No SiC coating was deposited on this structure. The bonded assembly was examined and the bonds between the SiC faceplate and the SiC ribs appeared strong.

What is claimed is:

1. A method of bonding a first silicon carbide part to a second silicon carbide part, the method comprising, provideing a receiving female joint member in said first silicon carbide part, providing an inserting male joint member to said second silicon carbide part, said male and female joint members each having facing sidewalls substantially parallel to a direction in which said male joint member is to be inserted into said female joint member, said male and female joint members being configured to provide a gap(s) between said facing sidewalls of between averaging up to about 0.003 inch (0.76 mm) when said male joint member is inserted in said female joint member, said female joint member further having reservoir means for receiving solid-state silicon while permitting said male joint member to be fully inserted into said female joint member, said reservoir means being disposed so as to be in fluid communication with said gap(s) formed when said male joint member is inserted into said female joint member, supplying solid-state silicon to said reservoir means, inserting said male joint member into said female joint member, heating said first and second silicon carbide parts to above the melting point of silicon for a time sufficient for the silicon to melt, whereupon molten silicon and/or silicon vapor enters said gap(s) between said facing sidewalls of said male and female joint members, and subsequently cooling said first and second parts to solidify said silicon, thereby securing the joint between said male and female joint members with solidified silicon forming a bond between said facing sidewalls of said male and female joint members.

2. A method in accordance with claim 1 wherein said first and second silicon carbide parts are formed of silicon carbide that is deposited by chemical vapor deposition.

3. A method of bonding a first silicon carbide part to a second silicon carbide part, the method comprising, providing a receiving female joint member in said first silicon carbide part, providing an inserting male joint member to said second silicon carbide part, said male and female joint members each having facing sidewalls substantially parallel to a direction in which said male joint member is to be inserted into said female joint member, said male and female joint members being configured to provide a gap(s) between said facing sidewalls averaging up to about 0.003 inch (0.76 mm) when said male joint member is inserted into said female joint member, said female joint member further having reservoir means for receiving solid-state silicon while permitting said male joint member to be fully inserted into said female joint member, said reservoir means being disposed so as to be in fluid communication with said gap(s) formed when said male joint member is inserted into said female joint member, supplying solid-state silicon to said reservoir means, inserting said male joint member into said female joint member, then heating said first and second silicon carbide parts to above the melting point of silicon for a time sufficient for the silicon to melt, whereupon molten silicon and/or silicon vapor enters said gap(s) between said facing sidewalls of said male and female joint members, chemical vapor depositing a cladding of silicon carbide on said first and second parts to provide a seal over said gap(s) to seal silicon between said male and female joint members, said deposition being done a) prior to melting said silicon or b) simultaneously with melting said silicon or c) subsequent to melting said silicon, and subsequently cooling said first and second parts to solidify said silicon, thereby securing the joint between said male and female joint members with solidified silicon forming a bond between said facing sidewalls of said male and female joint members.

4. A method in accordance with claim 3 wherein said first and second silicon carbide parts are formed of silicon carbide that is deposited by chemical vapor deposition.

* * * * *